US009664054B2

(12) United States Patent
Milne

(10) Patent No.: US 9,664,054 B2
(45) Date of Patent: May 30, 2017

(54) TURBOMACHINE ROTOR WITH BLADE ROOTS WITH ADJUSTING PROTRUSIONS

(75) Inventor: Trevor Milne, Waterthorpe (GB)

(73) Assignee: SIEMENS AKTIENGESELLSCHAFT, Münich (DE)

( * ) Notice: Subject to any disclaimer, the term of this patent is extended or adjusted under 35 U.S.C. 154(b) by 598 days.

(21) Appl. No.: 13/878,814

(22) PCT Filed: Sep. 7, 2011

(86) PCT No.: PCT/EP2011/065460
§ 371 (c)(1), (2), (4) Date: Apr. 11, 2013

(87) PCT Pub. No.: WO2012/048957
PCT Pub. Date: Apr. 19, 2012

(65) Prior Publication Data

US 2013/0195668 A1 Aug. 1, 2013

(30) Foreign Application Priority Data

Oct. 12, 2010 (EP) .................................... 10187227

(51) Int. Cl.

| | |
|---|---|
| ***B64C 11/04*** | (2006.01) |
| ***F03B 3/12*** | (2006.01) |
| ***F04D 29/34*** | (2006.01) |
| ***F04D 29/18*** | (2006.01) |
| ***F01D 5/30*** | (2006.01) |
| ***F01D 5/00*** | (2006.01) |
| ***F04D 19/02*** | (2006.01) |
| ***F04D 29/32*** | (2006.01) |

(52) U.S. Cl.
CPC ............... *F01D 5/30* (2013.01); *F01D 5/005* (2013.01); *F01D 5/3007* (2013.01); *F04D 19/02* (2013.01);
(Continued)

(58) Field of Classification Search
CPC .......... F01D 5/303; F01D 5/3038; F01D 5/30; F01D 5/3069; F01D 5/005; F04D 29/322
(Continued)

(56) References Cited

U.S. PATENT DOCUMENTS

| | | | |
|---|---|---|---|
| 2,619,318 | A | 11/1952 | Schaer |
| 4,645,425 | A | 2/1987 | Morrison, Jr. |

(Continued)

FOREIGN PATENT DOCUMENTS

| | | | |
|---|---|---|---|
| EP | 0388286 | A1 | 9/1990 |
| EP | 0757749 | B1 | 12/1997 |

(Continued)

*Primary Examiner* — Kenneth Bomberg
*Assistant Examiner* — Deming Wan

(57) ABSTRACT

A turbomachine rotor includes a rotor blade mounted to a rotation element. The rotor blade includes a root for mounting the rotor blade to the rotation element. The root has a protrusion structure forming a stop face supporting the mounted root against the rotation element under action of a radially inwardly directed force. The protrusion structure defines a maximum clearance between the stop face and the rotation element. The root is radially moveable to a certain extent where in a radially outermost position the protrusion structure has the maximum radial clearance from the rotation element. The rotation element includes a groove therein. The groove has a groove face bearing the stop face of the rotor blade under action of a radially inwardly directed force. The groove is a circumferential groove extending in a circumferential direction with regard to an axis of rotation of the rotation element.

9 Claims, 4 Drawing Sheets

(52) U.S. Cl.
CPC ........ *F04D 29/322* (2013.01); *F05D 2230/60* (2013.01); *F05D 2240/80* (2013.01); *F05D 2250/70* (2013.01); *Y10T 29/49316* (2015.01)

(58) Field of Classification Search
USPC ................................ 416/215–218; 415/173.1
See application file for complete search history.

(56) References Cited

U.S. PATENT DOCUMENTS

| | | | | |
|---|---|---|---|---|
| 5,310,317 | A | 5/1994 | Bailey | |
| 5,993,162 | A | 11/1999 | Weisse et al. | |
| 8,257,046 | B2 * | 9/2012 | Saito | F01D 5/16 415/115 |
| 2004/0107554 | A1 * | 6/2004 | McGee | F01D 5/225 29/23.51 |
| 2004/0120817 | A1 * | 6/2004 | Shapiro | F01D 5/3053 416/7 |
| 2006/0275125 | A1 | 12/2006 | Bibor | |
| 2009/0180886 | A1 * | 7/2009 | Derclaye | F01D 5/3038 416/215 |

FOREIGN PATENT DOCUMENTS

| | | | |
|---|---|---|---|
| EP | 1865153 | A2 | 12/2007 |
| GB | 2097480 | A | 11/1982 |
| RU | 2028458 | C1 | 9/1995 |

* cited by examiner

TURBOMACHINE ROTOR WITH BLADE ROOTS WITH ADJUSTING PROTRUSIONS

CROSS REFERENCE TO RELATED APPLICATIONS

This application is the US National Stage of International Application No. PCT/EP2011/065460 filed Sep. 7, 2011 and claims benefit thereof, the entire content of which is hereby incorporated herein by reference. The International Application claims priority to the European application No. 10187227.3 EP filed Oct. 12, 2010, the entire contents of which is hereby incorporated herein by reference.

FIELD OF INVENTION

The present invention relates to the field of turbomachines, and the assembly of bladed rotors.

ART BACKGROUND

EP 0 757 749 B1 relates to gas turbine engines. A pair of root rails is provided on the bottom of a dovetail-shaped root portion of a gas turbine engine blade to minimize reciprocating tangential motion of the blades within the dovetail shaped slots in which the root portions of the blades are retained. Each root rail is wedge shaped, tapering in a decreasing cross section from the base of the root toward the aerofoil platform.

In view of the above-described situation, there exists a need for an improved technique that enables to provide for an efficient assembly of a turbomachine.

SUMMARY OF THE INVENTION

This need may be met by the subject matter according to the independent claims. Advantageous embodiments of the herein disclosed subject matter are described by the dependent claims.

The inventor found that is beneficial to allow for a small relative movement of the compressor blades with respect to a rotation element of a compressor rotor to which they are mounted. This may be the case e.g. to cater for relative variations in material thermal expansion rates which otherwise could damage the mechanical integrity of the compressor rotor. Further, in order to obtain a small clearance between a compressor blade tip and a surrounding casing, it is beneficial to perform a final machining operation of the compressor blade tips of the assembled compressor rotor blade. This machining operation in combination with the machined compressor casing inner diameter defines the desired tip-to-casing clearance. However during the machining of the compressor blade tip the cutting forces push the compressor blade down into the rotation element while thereafter in operation under centrifugal loading the blade moves radially outwards. The inventor found that a large variation between the two conditions may hinder the ability to accurately control the desired tip clearance to the casing.

According to a first aspect of the invention there is provided a rotor blade, the rotor blade comprising a root for mounting the rotor blade to a rotation element of a turbomachine. The root comprises a protrusion structure forming a stop face supporting the mounted root against the rotation element under action of radially inwardly directed forces, the protrusion structure defining a maximum clearance between the stop face and the rotation element.

This aspect of the invention is based on the idea that a fine adjustment of the root dimension is easier and faster if not a full surface but only a protrusion structure of the root has to be machined or trimmed.

Generally herein, the term "radially inwardly" or "radially outwardly" refers to a direction with regard to a rotor blade mounted in a rotation element of a turbomachine rotor. That is, radially inwardly refers to a direction opposite the centrifugal forces that arise upon rotation of the turbomachine rotor. Radially outwardly refers to the opposite direction, i.e. to the direction of such centrifugal forces. In another, equivalent definition, "radially inwardly" refers to a direction from a tip to the root of the rotor blade and "radially outwardly" refers to a direction from the root to the tip of the turbomachine blade.

Further generally herein, the term "maximum clearance between the stop face and the rotation element" relates to the clearance (or, in other words, to the distance) between the stop face of the root and the rotation element in case the rotor blade is in its radially outermost position that is allowed by the rotation element to which the rotor blade is mounted.

According to an embodiment, the turbomachine is a gas turbine. According to a further embodiment, the turbomachine rotor is a compressor rotor.

According to an embodiment, the protrusion structure comprises at least one rail. For example, according to an embodiment, the protrusion structure comprises two rails. In one embodiment the rails run parallel and are radially curved to match the diameter at the face of the rotation element. However, other orientations of the rails are also possible and may or may not be curved to match at the face of the rotation element. Rails facilitate machining of the rails and hence a fine adjustment of a maximum radial clearance between the stop face of the rotor blade and the rotation element of the turbomachine.

According to a further embodiment, the protrusion structure comprises a circumferential rail, such as an annularly closed rail.

According to a further embodiment, the root further comprises a base portion located laterally adjacent the protrusion structure. The protrusion structure protrudes with regard to the base portion. According to an embodiment, the base portion of the root comprises or consists of a flat surface. A flat surface may facilitate machining operations. According to a further embodiment, the protrusion structure defines a stop plane of the root. In an embodiment, the flat surface and the stop plane are parallel. For example, if the bottom of the root comprises a flat surface or if the bottom of the root is a flat surface, in an embodiment the protrusion structure defines a flat bottom plane of the root. These embodiments may again facilitate machining of the protrusion structure.

According to an embodiment, the protrusion structure is located at a bottom of the root. According to other embodiments, the protrusion structure is provided at other locations of the root.

According to an embodiment, the stop face of the protrusion structure is curved. According to a further embodiment, the curvature of the stop face mates with the curvature of a surface of the rotation element that is opposite the protrusion structure in a mounted state.

According to a second aspect of the herein disclosed subject matter, a turbomachine rotor is provided, the turbomachine rotor comprising a rotation element and a rotor blade mounted to the rotation element, wherein the rotor blade is configured according to the first aspect or an embodiment thereof.

For example, in an embodiment, the turbomachine rotor comprises a rotation element and a rotor blade wherein the rotor blade comprises a root for mounting the rotor blade to a rotation element of a turbomachine. In accordance with aspects and embodiments of the herein disclosed subject matter the root comprises a protrusion structure forming a stop face supporting the mounted root against the rotation element under action of radially inwardly directed forces, i.e. forces towards the rotation element. Further in accordance with aspects and embodiments of the herein disclosed subject matter, the protrusion structure defines a maximum clearance between the stop face and the rotation element. According to embodiments of the herein disclosed subject matter the maximum clearance between the stop face and the rotation element is greater zero. The maximum clearance may be adjusted depending on the size of the turbomachine and the thermal expansion coefficients of the root of the rotor blade and the rotation element.

It should be understood that while only a single rotor blade is referenced in many embodiments described herein in order to illustrate the basic concept of these embodiments, a rotation element usually has a plurality of such rotor blades mounted thereto.

According to an embodiment, the protrusion structure defines a maximum radial clearance between the root and the rotation element. Hence, according to an embodiment, the root is radially moveable to a certain extent where in a radially outermost position the protrusion structure has the maximum radial clearance from the rotation element.

According to an embodiment, the rotation element comprises a groove therein, wherein the groove has a groove face bearing the stop face of the rotor blade under action of radially inwardly directed forces. Hence, in an embodiment the maximum radial clearance between the protrusion structure and the rotation element is the minimum distance between the protrusion structure and the groove face when the rotor blade is in its radially outermost position with regard to the rotation element.

According to an embodiment, the rotation element is a single piece which has the groove therein. According to other embodiments, the rotation element comprises two pieces configured for axial abutment wherein each piece forms part of the groove and the two pieces together form the groove when abutting each other.

According to a further embodiment, the rotor blade is mounted in the groove. Accordingly, in an embodiment, the groove has a cross section that is capable of retaining the rotor blade against radially outwardly directed forces such as centrifugal forces that arise upon rotation of the turbomachine rotor.

According to a further embodiment, the protrusion structure defines a stop plane (e.g. as described above with regard to the first aspect) and the stop plane of the protrusion structure and the groove face are parallel. This allows for a good support of the rotor blade on the groove bottom if radially inwardly directed forces are applied to the rotor blade.

According to a further embodiment, the groove is a circumferential groove extending in a circumferential direction with regard to an axis of rotation of the rotation element.

According to a further embodiment, the rotor blade has an further stop face for retaining the rotor blade against a radially outwardly directed force.

According to a further embodiment, the root of the rotor blade is movable within the rotation element between the stop face and the further stop face. With the rotor blade contacting the further stop face, the protrusion structure has the maximum clearance (distance) from the rotation element.

According to a third aspect of the herein disclosed subject matter, a method of assembling a turbomachine rotor is provided, the method comprising: (a) providing a rotor blade according to the first aspect or an embodiment thereof; (b) machining the protrusion structure to adjust the maximum clearance between the stop face and the rotation element; (c) mounting the rotor blade to the rotation element.

Due to the protrusion structure the adjustment of the maximum radial clearance between the stop face and the rotation element is facilitated and can be completed in a shorter time period.

According to a further embodiment, the method further comprises machining a radially outer portion of the rotor blade after mounting the rotor blade to the rotation element. Having adjusted the maximum clearance between the stop face and the rotation element to a desired, specific value, machining of a tip portion of the rotor blade can be performed so as to achieve a high accuracy of the distance between the rotor blade and a turbomachine casing that surrounds the turbomachine rotor with the rotor blade.

In the above there have been described and in the following there will be described exemplary embodiments of the subject matter disclosed herein with reference to a compressor blade, a compressor rotor and a method of assembling a compressor rotor. It has to be pointed out that of course any combination of features relating to different aspects of the herein disclosed subject matter is also possible. In particular, some embodiments have been described with reference to rotor blade claims whereas other embodiments have been described with reference to turbomachine rotor claims or method claims. However, a person skilled in the art will gather from the above and the following description that, unless other notified, in addition to any combination of features belonging to one aspect also any combination between features relating to different aspects or embodiments, for example even between features of the rotor blade claims and features of the turbomachine rotor claims or between features of the apparatus type claims and features of the method type claims is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

Figure 1:
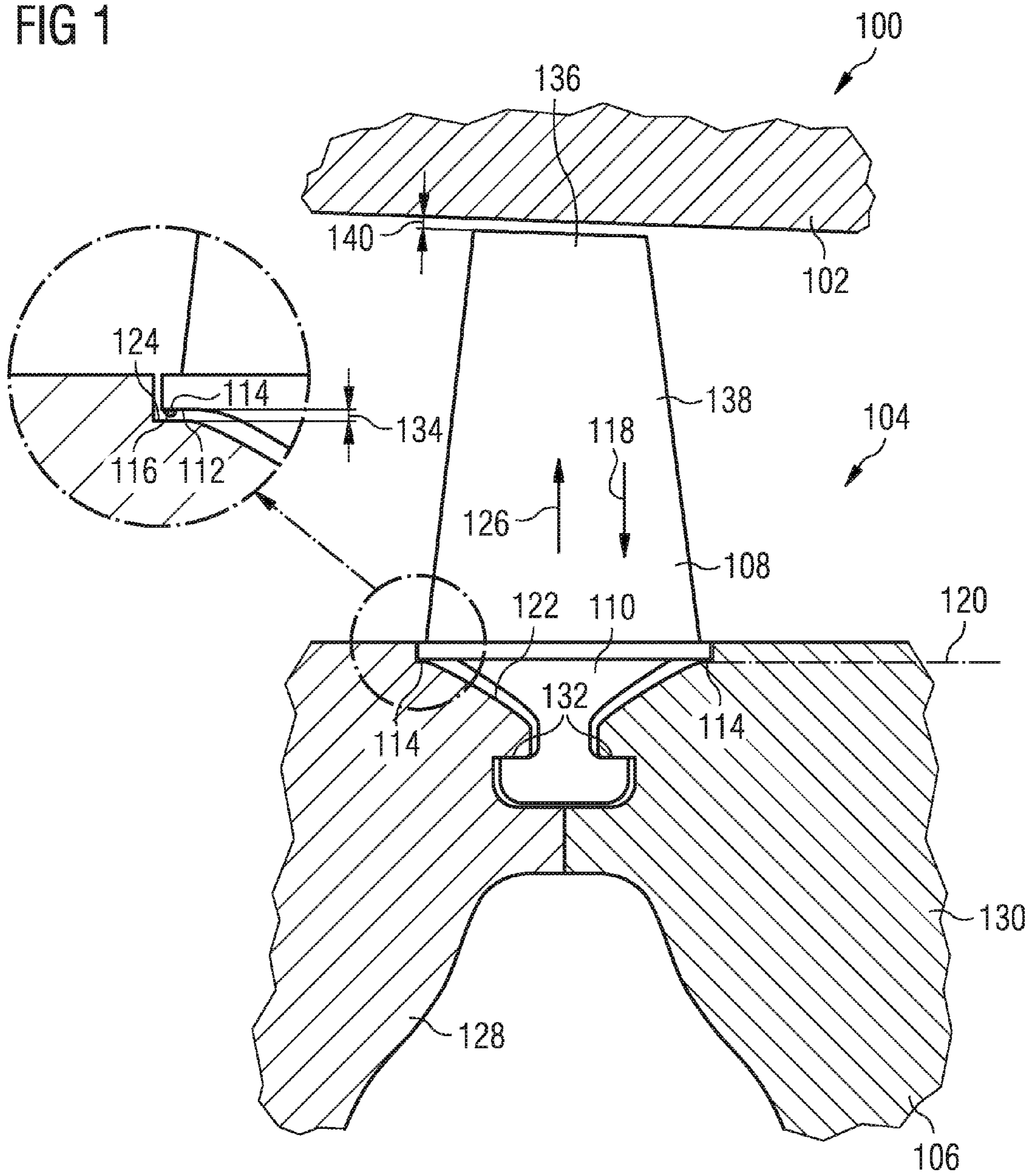
FIG. 1 shows a cross sectional view of part of a compressor of a gas turbine in accordance with embodiments of the herein disclosed subject matter.

The illustration in the drawings is schematic. It is noted that in different figures, similar or identical elements are provided with the same reference signs or with reference signs, which are different from the corresponding reference signs only within the first digit. The description of such elements is not repeated. Rather only differences between different figures are emphasized.

FIG. 1 shows a cross sectional view of part of a compressor of a gas turbine 100 in accordance with embodiments of the herein disclosed subject matter. In accordance with an embodiment, the compressor section of gas turbine 100 comprises a casing 102 and a rotor 104. The rotor comprises a rotation element 106 and a rotor blade 108. The rotor blade 108 comprises a root 110 for mounting the rotor blade 108 to the rotation element 106 of the gas turbine 100. In accordance with an embodiment, the root comprises a protrusion structure 114 and a base portion 112 located laterally adjacent the protrusion structure 114. The protrusion structure 114 protruding with regard to the base portion 112. According to an embodiment shown in FIG. 1, the protrusion structure 114 protrudes over the base portion 112 in a direction towards the rotation element 106.

In accordance with an embodiment the protrusion structure 114 forms a stop face 116 supporting the mounted root 110 against the rotation element 106 under action of radially inwardly directed forces, indicated at 118 in FIG. 1.

As shown in FIG. 1, in the vicinity of the protrusion structure the base portion 112 is flat and parallel to a stop plane 120 of the root 110, the stop plane 120 being defined by the protrusion structure 114.

In accordance with an embodiment shown in FIG. 1, the rotation element 106 comprises a groove 122, the groove 122 having a groove face 124 bearing the stop face 116 of the rotor blade 108 under action of radially inwardly directed forces 118. The rotation element 106 is formed by two discs 128, 130.

In accordance with a further embodiment, the rotor blade 108 has a further stop face 132 for retaining the rotor blade 108 against a radially outwardly directed force 126. In accordance with embodiments of the herein disclosed subject matter, root 110 of the rotor blade 108 is radially movable within rotation element 106 (in the depicted case within the groove 122) between the stop face 116 and the further stop face 132. Such a movability of the rotor blade 108 (in particular the root 110 thereof) allows to cope with different thermal expansion coefficients of the rotation element 106 and the root 110.

By appropriate machining of the protrusion structure, a maximum clearance 134 between the stop face 116 and the groove face 124 of the rotation element 106 can be adjusted to a desired value in a short time period, shorter than the time that would be necessary to machine a plain surface to obtain the same clearance 134. Precise adjustment of the clearance 134 provides necessary movability of the rotor blade 108 within the groove while at the same time providing sufficient accuracy in machining a tip 136 of an aerofoil 138 of the rotor blade 108 so as to achieve a desired clearance 140 between the tip 136 and the housing 102. By decreasing the clearance 140, the efficiency of the gas turbine 100 can be increased.

Figure 2:
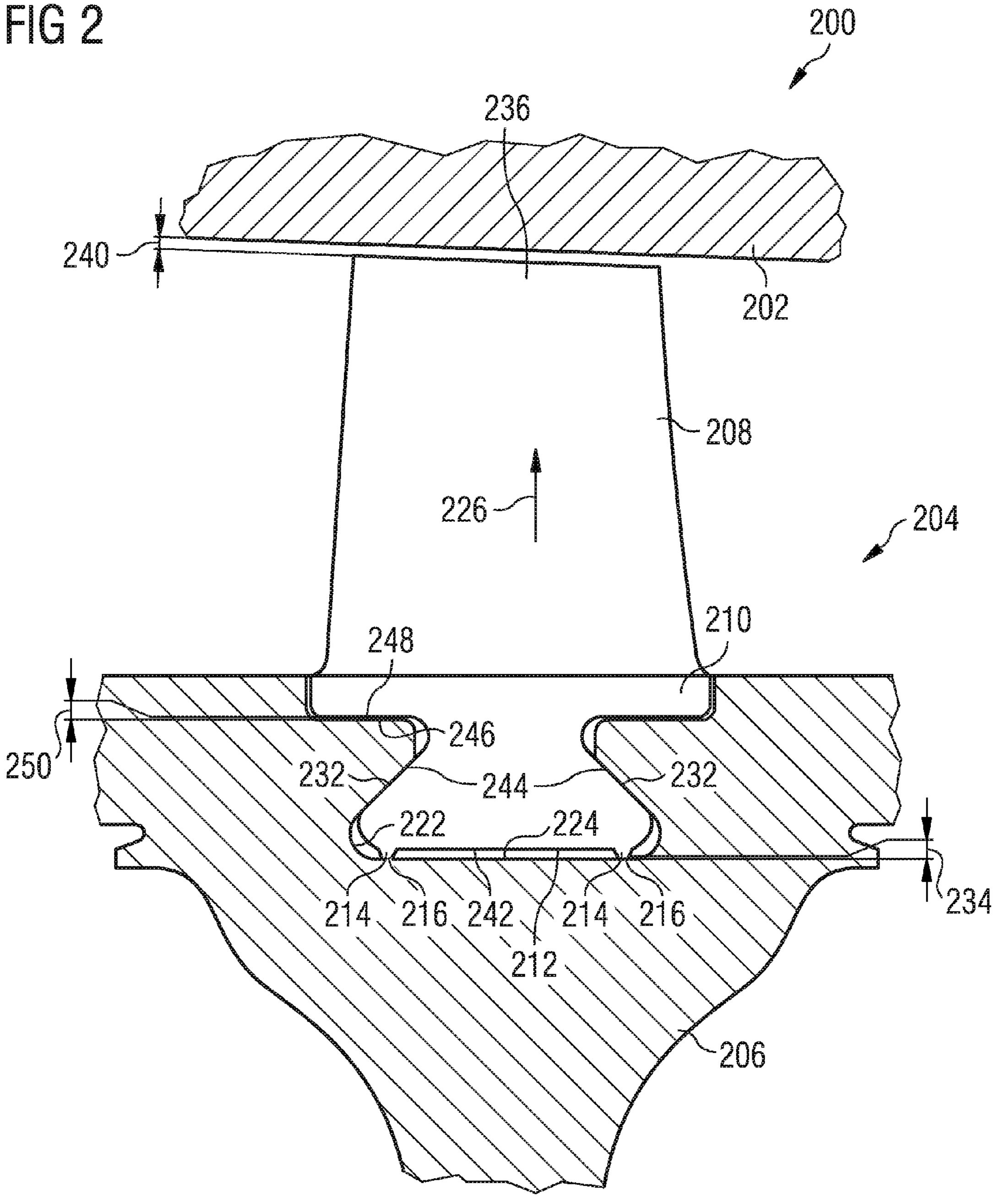
FIG. 2 shows a cross sectional view of part of a compressor of a further gas turbine in accordance with embodiments of the herein disclosed subject matter.

FIG. 2 shows a cross sectional view of part of a compressor of a further gas turbine 200 in accordance with embodiments of the herein disclosed subject matter.

In contrast to the gas turbine 100 shown in FIG. 1, the rotation element 206 of the rotor 204 is made of a single piece which comprises the groove 222. The groove 222 comprises a groove face 224. In contrast to FIG. 1, the groove face 224 is located at the bottom of the groove 222. Accordingly, the stop face 216 of the rotor blade 208 is provided by a protrusion structure 214 at the bottom 242 of the root 210. According to an embodiment the protrusion structure 214 comprises two rails that extend in parallel over the bottom 242 of the root 210. Between the rails, the bottom 242 comprises a base portion 212 forming a generally flat surface.

According to an embodiment, a further stop face 232 for retaining the rotor blade 208 against a radially outwardly directed force 226 is provided at an angle to a radial direction, indicated by the arrow 226 in FIG. 2. According to an embodiment shown in FIG. 2, the angle is different from 90 degrees, e.g. in a range from 30 to 60 degrees.

Likewise, also the corresponding bearing face 244 on the rotation element 206 is provided at an angle (e.g. the same angle as the further stop face 232) with regard to the radial direction indicated at 226. According to other embodiments, the further stop face and the corresponding bearing face of the rotation element are provided at an angle of 90 degrees with regard to the radial direction.

The rotor blade configuration shown in FIG. 2 also allows for a precise adjustment of the maximum radial clearance 234 between the root 210 and the rotation element 206. Hence the turbomachine 200 allows a precise machining of the blade tip in order to adjust the clearance 240 between the blade tip 236 and the casing 202.

It should be noted that root 210 may comprise a further face 246 that opposes a further face 248 of the rotation element. However, in accordance with embodiments of the herein disclosed subject matter, these opposing faces 246, 248 do not limit the radial movability of the root 210 in the groove 222 of the rotation element 206. In other words, the distance 250 between the opposing further faces 246, 248 is larger than the maximum radial clearance 234.

Figure 3:
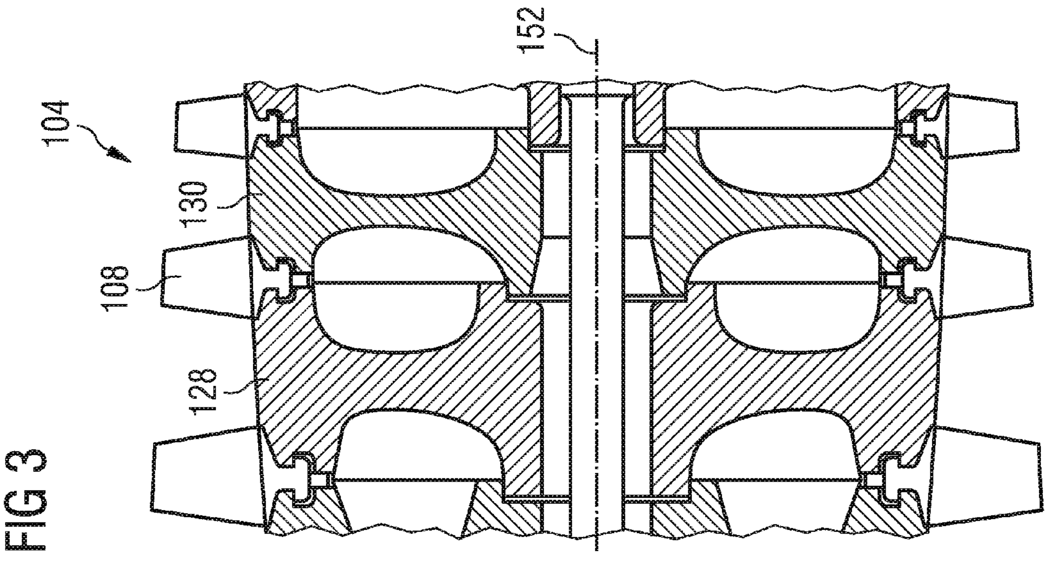
FIG. 3 shows a larger part of the compressor rotor of FIG. 1.

FIG. 3 shows a larger part of the compressor rotor 104 of FIG. 1. As is apparent from FIG. 3, the compressor rotor 104 comprises a plurality of rotation elements. Each of the rotation elements is formed by two discs, of which two are indicated at 128 and 130. Each rotation element comprises a plurality of rotor blades, one of which is indicated at 108 in FIG. 3. An axis of rotation of the compressor rotor 104 is indicated at 152 in FIG. 3.

Figure 4:
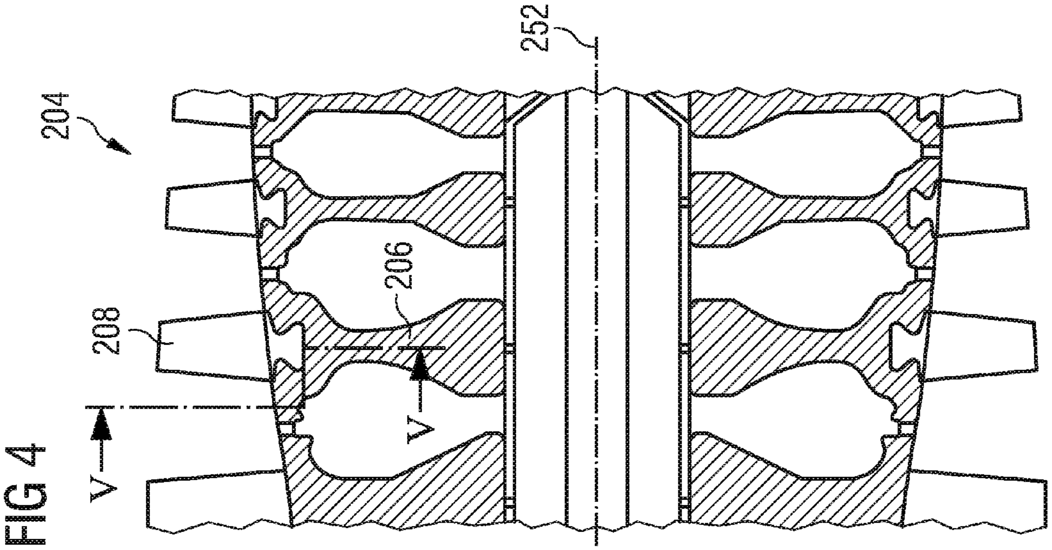
FIG. 4 shows a larger part of the compressor rotor of FIG. 2.

FIG. 4 shows a larger part of the compressor rotor 204 of FIG. 2. As is apparent from FIG. 4, the compressor rotor 204 comprises a plurality of rotation elements. Each of the rotation elements is formed by a single disc, one of which is indicated at 206. Each rotation element 206 comprises a plurality of rotor blades, one of which is indicated at 208 in FIG. 4. An axis of rotation of the compressor rotor 204 is indicated at 252 in FIG. 4.

Figure 5:
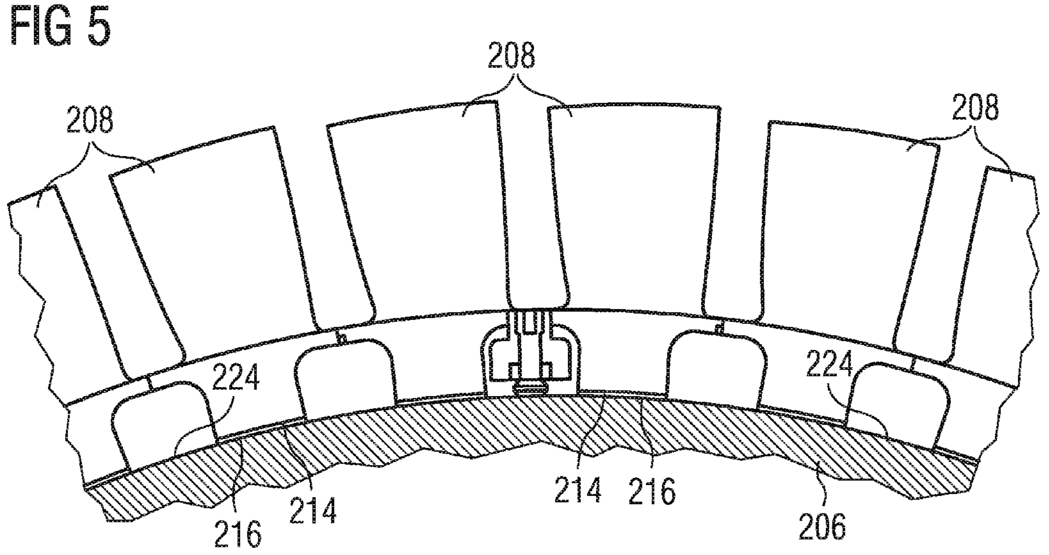
FIG. 5 shows a partially cross-sectional view of the rotation element with mounted rotor blades of FIG. 4 along line V-V.

FIG. 5 shows a partially cross-sectional view of the rotation element 206 with mounted rotor blades 208 of FIG. 4 along line V-V. According to an embodiment shown in FIG. 5, the stop face 216 of the protrusion structure 214 is curved to match the groove face 224 that faces the stop face 216. Hence, in an embodiment the stop face 216 of the protrusion structure is curved in circumferential direction of the groove face 224 rotation element. In other embodiments, the stop face of the protrusion structure may be flat. For example, in such a case the protrusion structure is tangential to the rotation element 206.

Figure 6:
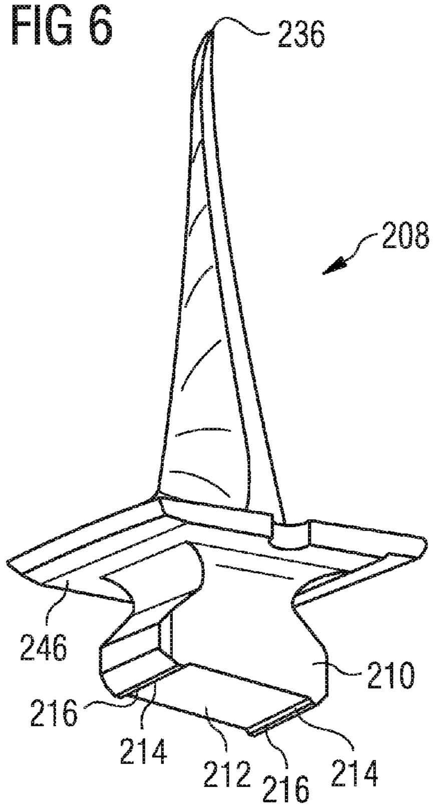
FIG. 6 shows a perspective view of a rotor blade in accordance with embodiments of the herein disclosed subject matter.

FIG. 6 shows a perspective view of a rotor blade 208 in accordance with embodiments of the herein disclosed subject matter. FIG. 6 shows in particular the root 210 of the rotor blade 208 which comprises, in accordance with an embodiment, a protrusion structure 214 in the form of two rails with a stop face 216. Between the rails extends the base portion 212 of the root. According to embodiments of the herein disclosed subject matter, the base portion 212 forms a recess with regard to the protrusion structure. In a further embodiment, the root 210 forms a dovetail shaped bottom profile, as shown in FIG. 6. The dovetail shaped bottom profile formed by the protrusion structure 214 and the base portion 212 may be curved to match the disc (rotation element) profile or may be flat, thereby easing manufacturing. In an embodiment only the rails but not the base portion 212 of the protrusion structure 214 have to be machined to match the profile of the rotation element, saving time and costs. FIG. 6 also shows the further face 246 of the root 210 and the tip 236 of the rotor blade 208.

Although FIG. 1 and FIG. 2 show part of a compressor of a gas turbine, it should be noted that aspects, embodiments and examples of the herein disclosed subject matter are as well applicable to other types of turbomachines e g compressors and steam turbines or to other parts of a gas turbine, like a turbine section comprising blades and discs. Protrusion structures according to embodiments of the herein disclosed subject matter may be machined faster than plain surfaces. Hence embodiments of the herein disclosed subject matter may allow for a fast and efficient adaption of the maximum clearance and the maximum movability of rotor blade with respect to a rotation element to which the rotor blade is mounted. As a consequence the machining time required during assembly of the turbomachine can be reduced. Although the protrusion structure intentionally provides a relatively small stop face area, this relatively small stop face area is sufficient to withstand the radially inwardly directed forces that arise during machining of the blade tip of the already mounted rotor blade.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the herein disclosed subject matter one can state:

It is described a rotor blade comprising a root for mounting the rotor blade to a rotation element of a turbomachine. The root comprises a base portion and a protrusion structure protruding with regard to the base portion laterally adjacent the protrusion structure. The protrusion structure forms a stop face supporting the mounted root against the rotation element under action of radially inwardly directed forces. Further, a respective turbomachine rotor is provided.

In an exemplary embodiment of a gas turbine, one method of constructing the rotor of a compressor of the gas turbine is to assemble several discs tied together with a central tension stud. Rotor blades may be entrapped between two adjacent discs as shown in FIG. 1 or loaded into a groove within a disc as shown in FIG. 2. Both methods provide means of radial location of the rotor blades thus retaining the rotor blades in operation under centrifugal load. It is beneficial to control the amount of radial location accuracy for operation of the gas turbine whereby closer tip clearances of the aerofoil to the outer casing results in improved compressor efficiency.

Embodiments of the herein disclosed subject matter describe a rotor blade, a turbomachine rotor and a method of achieving close fitting radial assembly accuracy by enabling fine adjustment at the assembly stage of rotor blade into the respective rotation element prior to final tip diameter machining. Embodiments of the herein disclosed subject matter reduce the reliance on costly tight manufacturing limits that may otherwise be required. Additionally, there is introduced a flexibility desired in a low volume assembly environment where adjustments are normal practice to improve build accuracy at low cost.

The invention claimed is:

1. A method of assembling a turbomachine rotor, the method comprising:

providing a rotor blade comprising a root for mounting the rotor blade to a rotation element of a turbomachine, the root comprising a protrusion structure forming a stop face supporting the mounted root against the rotation element, the rotation element comprising a groove wherein the groove having a groove face, under action of a radially inwardly directed force;

machining the protrusion structure to adjust a maximum radial clearance between the stop face and the rotation element such that the root is radially moveable to a certain extent when being mounted to the rotation element where in a radially outermost position the protrusion structure has the maximum radial clearance from the rotation element;

mounting the rotor blade to the groove face of the rotation element, the groove face bearing the stop face of the rotor blade under action of a radially inwardly directed force, wherein the groove is a circumferential groove extending in a circumferential direction with regard to an axis of rotation of the rotation element; and wherein the protrusion structure defines a maximum radial clearance between the stop face and the groove face of the rotation element.

2. The method according to claim 1, further comprising:

machining a radially outer portion of the rotor blade after mounting the rotor blade to the rotation element.

3. A turbomachine rotor, comprising:

a rotation element; and a rotor blade mounted to the rotation element;

wherein the rotor blade comprises a root for mounting the rotor blade to the rotation element;

wherein the root comprises a protrusion structure forming a stop face supporting the mounted root against the rotation element under action of a radially inwardly directed force, and a base portion located laterally adjacent the protrusion structure, the protrusion structure protruding with regard to the base portion;

wherein the rotation element comprises a groove therein, the groove having a groove face bearing the stop face of the rotor blade under action of a radially inwardly directed force, wherein the groove is a circumferential groove extending in a circumferential direction with regard to an axis of rotation of the rotation element, wherein the protrusion structure defines a maximum radial clearance between the stop face and the groove face of the rotation element;

wherein the root is radially moveable to a certain extent where in a radially outermost position the protrusion structure has the maximum radial clearance from the rotation element; and wherein the protrusion structure defines a stop plane of the root, the base portion being parallel to the stop plane.

4. The turbomachine rotor according to claim 3, wherein the rotor blade has a further stop face for retaining the rotor blade against a radially outwardly directed force; and the root is movable within the rotation element between the stop face and the further stop face.

5. The turbomachine rotor according to claim 3, wherein the protrusion structure comprises at least one rail.

6. The turbomachine rotor according to claim 3, wherein the base portion comprises a flat surface; and the protrusion structure defines a stop plane of the root, the flat surface and the stop plane being parallel.

7. The turbomachine rotor according to claim 3, wherein the protrusion structure is located at a bottom of the root.

8. The turbomachine rotor according to claim 3, wherein the stop face of the protrusion structure is curved.

9. The turbomachine rotor according to claim 8, wherein the curvature of the stop face mates with the curvature of a surface of the rotation element that is opposite the protrusion structure in a mounted state.

* * * * *